US008542619B2

(12) United States Patent
Stewart et al.

(10) Patent No.: US 8,542,619 B2
(45) Date of Patent: Sep. 24, 2013

(54) METHOD AND APPARATUS FOR PERFORMING MOBILITY MEASUREMENTS IN A COMMUNICATION NETWORK

(75) Inventors: Kenneth A. Stewart, Grayslake, IL (US); Jean-Aicard Fabien, Lincolnshire, IL (US); Michael E. Buckley, Grayslake, IL (US); Raja S. Bachu, Somerset, NJ (US)

(73) Assignee: Motorola Mobility LLC, Libertyville, IL (US)

( * ) Notice: Subject to any disclaimer, the term of this patent is extended or adjusted under 35 U.S.C. 154(b) by 251 days.

(21) Appl. No.: 13/073,532

(22) Filed: Mar. 28, 2011

(65) Prior Publication Data

US 2011/0261736 A1 Oct. 27, 2011

Related U.S. Application Data

(63) Continuation of application No. 11/969,748, filed on Jan. 4, 2008, now Pat. No. 7,920,494.

(51) Int. Cl.
*H04B 7/00* (2006.01)

(52) U.S. Cl.
USPC .......................................................... 370/310

(58) Field of Classification Search
USPC ................................................. 370/310–350
See application file for complete search history.

(56) References Cited

U.S. PATENT DOCUMENTS

| | | | | |
|---|---|---|---|---|
| 5,887,252 A * | 3/1999 | Noneman | ..................... | 455/463 |
| 6,920,108 B1 * | 7/2005 | Chapman et al. | .......... | 370/230.1 |
| 6,959,199 B2 * | 10/2005 | Ohkubo et al. | ............... | 455/522 |
| 7,072,693 B2 * | 7/2006 | Farlow et al. | .............. | 455/562.1 |
| 7,203,512 B2 * | 4/2007 | Jeong et al. | ..................... | 455/522 |
| 7,920,494 B2 * | 4/2011 | Stewart et al. | ................ | 370/310 |
| 2004/0120285 A1 * | 6/2004 | Paila et al. | ..................... | 370/331 |
| 2005/0207416 A1 * | 9/2005 | Rajkotia | ........................ | 370/390 |
| 2005/0259617 A1 * | 11/2005 | Wason et al. | ................. | 370/329 |
| 2006/0109820 A1 * | 5/2006 | Miyata | ........................... | 370/332 |
| 2006/0128433 A1 * | 6/2006 | Liang et al. | ................. | 455/560 |
| 2006/0198353 A1 * | 9/2006 | Wason et al. | ................. | 370/347 |
| 2007/0121538 A1 * | 5/2007 | Ode et al. | ...................... | 370/323 |
| 2007/0201507 A1 * | 8/2007 | Yamazaki et al. | ............ | 370/464 |
| 2007/0211657 A1 * | 9/2007 | McBeath et al. | .............. | 370/329 |
| 2008/0002732 A1 * | 1/2008 | Tzeng et al. | ................. | 370/412 |
| 2008/0037535 A1 * | 2/2008 | Yoon et al. | .................... | 370/389 |
| 2008/0080474 A1 * | 4/2008 | Kitchin | ......................... | 370/349 |
| 2008/0112419 A1 * | 5/2008 | Lee et al. | ....................... | 370/401 |

(Continued)

OTHER PUBLICATIONS

"3rd Generation Partnership Project, Technical Specification Group Radio Access Network; Physical Channels and Modulation". (Release 8), 3GPP TS 36.211 V1.0.0 (Mar. 2007).

(Continued)

*Primary Examiner* — Fan Ng

(57) ABSTRACT

A method and apparatus for performing mobility measurement in a communication network (100) is described. The method comprises of receiving a subframe sequence pattern from a node in the communication network (100). The subframe sequence pattern indicates types of subframes being transmitted by a neighboring cell node (104) in a neighboring cell (112). The method includes receiving a subframe from a sequence of subframes transmitted by the neighboring cell node (104) in the neighboring cell (112), and determining that the received subframe is a multicast subframe based on the subframe sequence pattern. The method then includes performing a single cell-specific reference symbol measurement in response to determining that the received subframe is the multicast subframe.

18 Claims, 7 Drawing Sheets

(56) References Cited

U.S. PATENT DOCUMENTS

| | | | | |
|---|---|---|---|---|
| 2008/0181156 | A1* | 7/2008 | Ecclesine | 370/311 |
| 2008/0232396 | A1* | 9/2008 | Buckley et al. | 370/465 |
| 2009/0016306 | A1* | 1/2009 | Wang et al. | 370/338 |
| 2009/0175179 | A1* | 7/2009 | Stewart et al. | 370/252 |
| 2009/0175193 | A1* | 7/2009 | Shaffer et al. | 370/254 |
| 2009/0316614 | A1* | 12/2009 | Kim et al. | 370/312 |
| 2010/0215004 | A1* | 8/2010 | Yoo | 370/329 |

OTHER PUBLICATIONS

"3rd Generation Partnership Project, Technical Specification Group Radio Access Network; Physical Channels and Modulation", (Release 8), 3GPP TS 36.211 V1.2.0 (Jun. 2007).

"3rd Generation Partnership Project Technical Specification Group Radio Access Network; Physical layer-measurements", (Release 8), 3GPP TS 36.214 V1.1.0 (Jun. 2007).

"3rd Generation Partnership Project; Technical Specification Group Radio Access Network; Multimedia Broadcast Multicast Service (MBMS); UTRAN/GERAN Requirements", 3GPP TR 25.992 V6.0.0 (Sep. 2003).

"3rd Generation Partnership Project; Technical Specification Group Radio Access Network; Introduction of the Multimedia Broadcast Multicast Service (MBMS) in the Radio Access Network (RAN); Stage 2", (Release 6), 3GPP TS 25 346 V6.7.0 (Dec. 2005).

"3rd Generation Partnership Project; Technical Specification Group Services and System Aspects; Multimedia Broadcast/Multicast Service (MBMS); Architecture and functional description", (Release 6), 3GPP TS V6.9.0 (Dec. 2005).

"3rd Generation Partnership Project; Technical Specification Group Services and System Aspects; Vocabulary for 3GPP Specifications", (Release 7), 3GPP TR 21.905 V7.0.0. (Sep. 2005).

Nokia Siemens Networks, et al., "Mobility and CQI Measurements in Mixed Unicast/MBSFN Carries", 3GPP Dradt R1-072282, 3rd Generation Partnership Project, Mobile Competence Centre; XP050106012, May 2, 2007, Sophia-Antipolis, France.

Motorola, "Reference Signals for Mobility Related Measurement", 3GPP Draft R1-071330, 3rd Generation Partnership Project, Mobile Competence Centre; XP05010582; Mar. 20, 2007, Sophia-Antipolis, France.

Motorola, "Mobility Measurements for E-UTRA TDD Mode", 3GPP Draft R1-071860, 3rd Generation Partnership Project, Mobile Competence Centre; XP050111765; Apr. 10, 2007, Sophia-Antipolis, France.

Huawei, "MBSFN Subframe Indication", 3GPP Draft R1-071690, 3rd Generation Partnership Project, Mobile Competence Centre; XP050105613l Mar. 21, 2007, Sophia-Antipolis, France.

Zyren J. "Overview of the 3GPP Long Term Evolution Physical Layer", XP002458194; http://www.freescale.com/wireless_comm/doc/white_paper/3GPPEVOL, 2.3.2 OFDMA; LTE generic frame structure 3.3 MB-SFN; Nov. 1, 2007.

* cited by examiner

METHOD AND APPARATUS FOR PERFORMING MOBILITY MEASUREMENTS IN A COMMUNICATION NETWORK

CROSS REFERENCE TO RELATED APPLICATIONS

The present application is a continuation of commonly assigned U.S. application Ser. No. 11/969,748, filed Jan. 4, 2008, now U.S. Pat. No. 7,920,494 from which benefits under 35 USC 120 are hereby claimed and the contents of which are incorporated herein by reference.

FIELD OF THE DISCLOSURE

The present disclosure relates generally to communication network and more particularly to perform mobility measurements in a communication network.

BACKGROUND

In a wireless communication network, communication is established between a node and a plurality of mobile devices. Typically, communication is established over a link known as an uplink/downlink for communicating data between the node and a mobile device. However, such a link weakens as the mobile device travels to the edge of a cell or to another cell, and as a result the mobile device may have discontinuous communication with the node. The mobile device therefore establishes a new link with a node in a neighboring cell when the mobile device tends to travel to the corresponding neighboring cell. The mobile device however, prior to establishing such a new link, performs mobility measurement on one or more of the neighboring cells. Such measurement may be a general measurement of a total power received from a transmitter of the node located at the neighboring cell.

Upon performing mobility measurement on the neighboring cells, the mobile device selects a cell, or makes a report to facilitate selection of a cell, that has an optimized communication configuration. For example, the selected cell may have a maximum power level and so is the best neighboring cell to provide uninterrupted or continuous communication between the node and the mobile device.

In the existing technique, the mobile device receives unicast subframes from each node in the neighboring cells and performs mobility measurements over such received unicast subframes. The mobility measurement is for only unicast subframes as only one type of transmission known as unicast transmission occurs in the communication network. However, the technology has been upgraded and in some instance, the neighboring cell may support both unicast and multicast subframe transmission, or hybrid combinations thereof. Multicast subframes include subframes comprising both unicast and multicast components, but at least a portion of the subframe is transmitted in a multicast fashion. Observations of a transmission, e.g., multicast transmission, in which multiple neighboring cells are participating, does not generally enable the mobile device to identify a specific individual and optimal neighboring cell, and indeed can lead to erroneous mobility measurement when such observations are treated as unicast observations. However, in a conservative measurement strategy, all transmissions comprising, in part, multicast transmissions, are neglected by the mobile device during mobility measurement. Such negligence may lead to increased mobile device mobility measurement activity and ultimately to higher power consumption by the mobile device when seeking to maintain specified mobility measurement accuracy, or to a loss of measurement accuracy. Thus, there is a need for the mobile device to perform mobility measurements for any type of subframe received in the communication network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
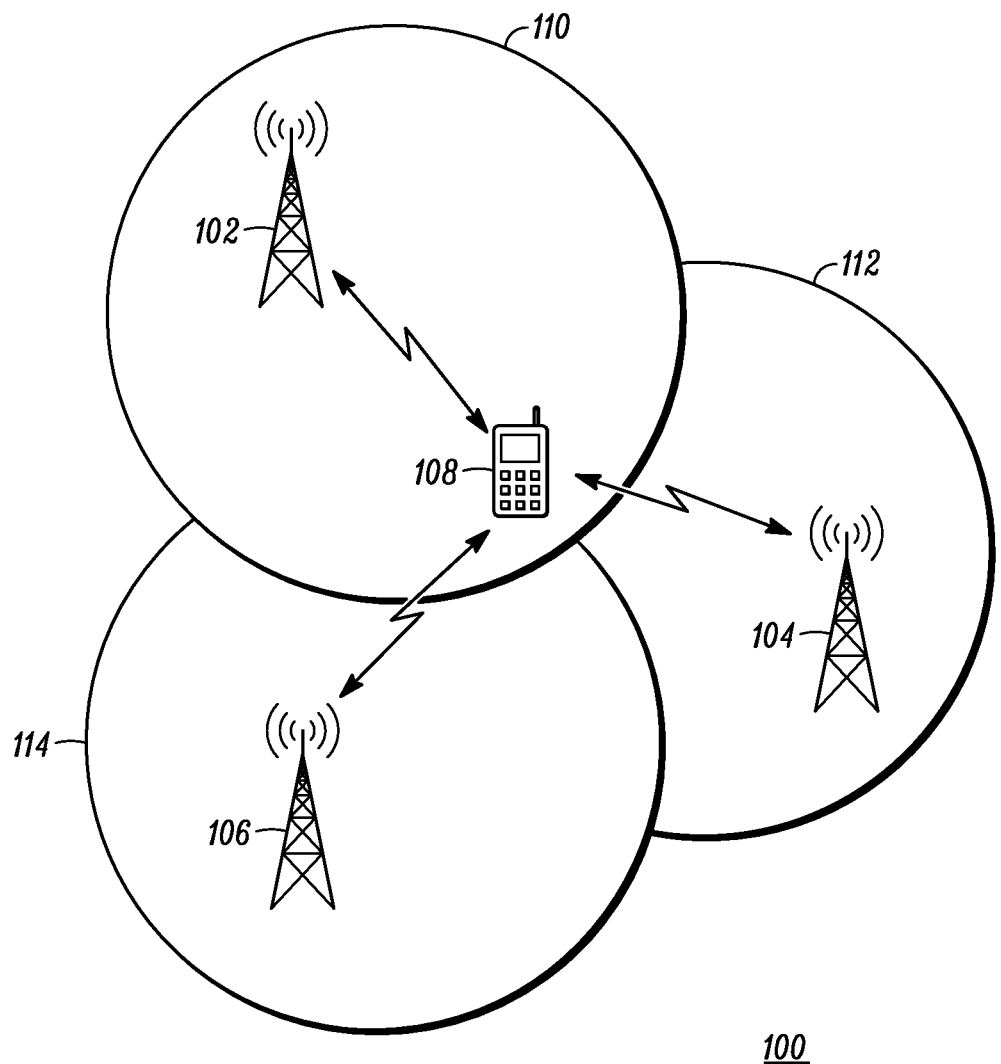
FIG. 1 is a system diagram of a communication network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Various embodiments are disclosed herein for performing mobility measurements, such as a reference symbol power measurement, in a communication network. One method in a mobile device includes receiving a subframe sequence pattern from a node in the communication network. The subframe sequence pattern indicates types of subframes being transmitted by a node in a neighboring cell. The method further includes receiving a subframe from a sequence of subframes transmitted by the neighboring cell node in the neighboring cell, and determining that the received subframe is a multicast subframe based on the subframe sequence pattern. The method then includes performing a single cell-specific reference symbol measurement in response to determining that the received subframe is the multicast subframe.

FIG. 1 is a system diagram of a communication network in accordance with some embodiments. The communication network 100 comprises a plurality of cells 110, 112, and 114. The cell 110 includes a node 102 and a mobile device 108 that is communicatively coupled to the node 102. Similarly, each cell in the communication network 100 comprises a node and at least one mobile device electrically connected to the node. For example, the cell 112 includes a node 104 and the cell 114 includes a node 106.

The cell 110 in which the mobile device 108 resides is known as serving cell, and the node 102 in such a serving cell is known as serving cell node. Similarly, the cells 112 and 114 adjacent to the serving cell 110 are known as neighboring cells and the nodes 104 and 106 in such neighboring cells are known as neighboring cell nodes. Note that while FIG. 1 illustrates physically separate nodes, some or all of the nodes may also be co-located. For example, each cell node may comprise a sector of a multi-sector cell site.

In one embodiment, the cells 110-114 may support a multimedia broadcast/multicast service (MBMS). The MBMS is a service in which the multimedia subframes may be broadcast or multicast in the communication network 100. The network that supports MBMS via time-synchronous co-frequency transmission may be known as a multicast broadcast single frequency network (MBSFN).

In the communication network 100, the nodes 102-106 may transmit subframes to the mobile device/terminal 108 in either unicast mode or multicast mode. The mode in which the subframes are transmitted from one node in the network 100 to a single mobile device is known as unicast mode and the transmission of such subframes is known as unicast transmission. Similarly, the mode in which subframes bearing the same content are transmitted by at least one, and more likely a plurality of nodes in the communication network 100 to at least one mobile device, and likely many mobile devices simultaneously, is known as multicast mode and the transmission of such subframes is known as multicast transmission. Also, such a group of nodes is known as a multicast group. Further, the subframe transmitted in a unicast mode is known as a unicast subframe, and the subframe transmitted in a multicast mode is known as a multicast subframe.

Typically, in an evolved universal mobile telecommunication system terrestrial radio access network (EUTRAN) configured to support MBMS, a plurality of subframes is transmitted in a sequence from one or more nodes, e.g., the multicast group of nodes, to one or more mobile devices in the communication network 100. The sequence of such subframes transmitted by the multicast group is known as a subframe sequence pattern or more simply subframe sequence. Each node has a subframe sequence pattern that indicates types of subframes being transmitted and the position of such subframes in the sequence of subframes transmitted by the node. For example, the subframe sequence pattern may be a pattern of a sub-sequence of 4 multicast subframes followed by a sub-sequence of 6 unicast subframes, or some longer, more irregular sequence.

In one embodiment, the mobile device 108 establishes a communication link known as uplink/downlink for communicating data between the node and the mobile device 108. The embodiment is described from the perspective of mobile device 108. The embodiment described herein is applicable to any mobile device in the communication network 100 and not limited to the mobile device 108. The mobile device 108 initially registers with the communication network 100 by establishing a communication link with the serving node 102 in the serving cell 110. The established communication link would be strong when the mobile device 108 is located nearer to the serving cell node 102. Further, the communication link weakens as the mobile device 108 travels to the edge of the serving cell 110 and may not have continuous communication with the serving cell node 102. The mobile device 108 thus attempts to establish a new communication link with a neighboring cell node in the neighboring cells. The process of establishing such a link with the neighboring cell node is known as a handoff process or procedure.

The mobile device 108 prior to establishing the new communication link, performs mobility measurements on the neighboring cells, and may report such measurements to the network for further processing. Such mobility measurements may include an estimate of the received power level in each of the neighboring cells 112,114, or an estimate of the power level of pilot or reference symbols made available by the neighboring cell, although other measurements such as reference symbol signal-to-noise ratio or reference symbol signal-to-noise-plus-interference ratio are also applicable. The mobile device 108 then selects the neighboring cell 112 that has an optimal measurement report, such as a maximum power level. In this case, the measured power level indicates the signal strength in the neighboring cell 112. The mobile device 108 performs such power measurement by measuring the power level in a sequence of subframes received from each of the neighboring cell nodes 104,106 in the communication network 100. Specifically, the mobile device 108 performs such power measurement in each subframe by measuring power in each of the reference symbols, and computing a linear average of such measured power over the entire subframe. The process of such power measurement using reference symbols is known as reference symbol received power measurement (RSRP). Other applicable mobility measurements include reference symbol signal-to-noise ratio (RS-SNR) or reference symbol signal-to-interference-plus-noise ratio (RS-SINR).

In an embodiment, the mobile device 108 in the communication network 100 may be a wireless device, a mobile station, a user-equipment, or any similar device that can transmit and receive signals. In an embodiment, the mobile device 108 is configured to operate according to any of a number of different 2G, 3G and 4G wireless communication technologies. These include Global System for Mobile Communication (GSM), Code Division for Multiple Access (CDMA), Universal Mobile Telecommunication System (UMTS), Wideband Code Division for Multiple Access (W-CDMA), Orthogonal Frequency Division Multiplexing (OFDM), Single Carrier Frequency Division Multiple Access (SC-FDMA), Discrete Fourier Transform-Spread Orthogonal Frequency Division Multiplexing (DFT-SOFDM), Interleaved Frequency-Division Multiple Access (IFDMA), Worldwide Interoperability for Microwave Access (WiMax), Long-Term Evolution (LTE) and other communication technologies.

In an embodiment, the nodes 102-106 establish communication with each of the mobile devices in the respective cell area 110-114. The nodes 102-106 transmit and receive signals from different mobile devices and infrastructure components (not shown) that provide wireless communication to the mobile devices. The nodes 102-106 may include a switching center that establishes a communication session between the mobile devices or with the mobile devices in another network. The node may be a base station, an access point, an evolved node B (eNB) or any similar device that transmits subframes in the communication network 100.

In one embodiment, the serving cell node 102 has a list of neighboring nodes known as a neighboring list or neighbor list. The serving cell node 102 establishes communication with each of the neighboring cell nodes 104, 106 in the neighboring list, and exchanges a subframe sequence pattern with the neighboring cell nodes 104, 106, possible via another network entity such as a multimedia gateway (not shown), or mobility management entity (not shown). The subframe sequence pattern provides information on the sequence of subframes being transmitted by the neighboring nodes. Information may be the types of subframes transmitted, and the position of such subframes in the sequence of subframes transmitted by each neighboring cell node. Note that in this embodiment, subframe patterns may be cell-specific, may simply indicate that no multicast subframes are transmitted, or that all subframes are multicast subframes except for those subframes not permitted to be multicast, such as those bearing physical broadcast channel (PBCH) or Synchronization Channel (SCH) transmissions. The serving cell node 102 then transmits the subframe sequence pattern of each neighbor cell to the mobile device 108 which is later utilized by the mobile device 108 for measuring the power level or RSRP or RS-SINR of each neighboring cell. The transmission by the serving cell node 102 may be in the form of a broadcast or common control transmission or a dedicated control transmission.

An actual network may be significantly more complex and may include various additional known entities, such as base site controllers, billing, authorization, authentication, and voice mail servers that are not directly relevant to the present discussion. It is possible that neighboring networks may operate using the same or different communication technologies. The embodiments described focus on establishing communication between mobile device 108 and the nodes 102-106.

Operationally, the serving cell node 102 receives a subframe sequence pattern from the neighboring cell node 104. The received subframe sequence pattern may be independent of a subframe sequence pattern of the serving cell node 102. The serving cell node 102 then transmits the received subframe sequence pattern to the mobile device 108 that is located at the edge of the serving cell 110 and tends to move to the neighboring cell 112.

In one embodiment, the mobile device 108 may receive the subframe sequence pattern directly from the neighboring cell node 104 over the control channels such as a broadcast control channel (BCH), or a multicast control channel (MCCH) in the neighboring cell 112. In another embodiment, the mobile device 108 receives a single bit signal or single binary indicator that indicates a type of transmission mode of the neighboring cell node 104. The signal bit signal or single binary indicator is received directly over a control channel such as a physical broadcast channel (PBCH), from the serving cell node 102.

At the other end, the mobile device 108 receives the subframe sequence pattern of the neighboring cell node 104 and stores such subframe sequence pattern in a memory/database of the mobile device 108. Further, the mobile device 108 receives a subframe from a sequence of subframes being transmitted by the neighboring cell node 104 in the neighboring cell 112. The mobile device 108 then determines the type of subframe received based on the stored subframe sequence pattern of the corresponding neighboring cell node 104. The mobile device 108 finally performs mobility measurements such as power or RSRP or RS-SINR measurements for the received subframe based on the type of subframe determined by the mobile device 108. Specifically, the mobile device 108 performs mobility measurements for only one reference symbol (RS)-bearing OFDM symbol if the determined subframe is a multicast subframe, and performs power measurement for up to four RS-bearing OFDM symbol if the determined subframe is a unicast subframe.

Figure 2:
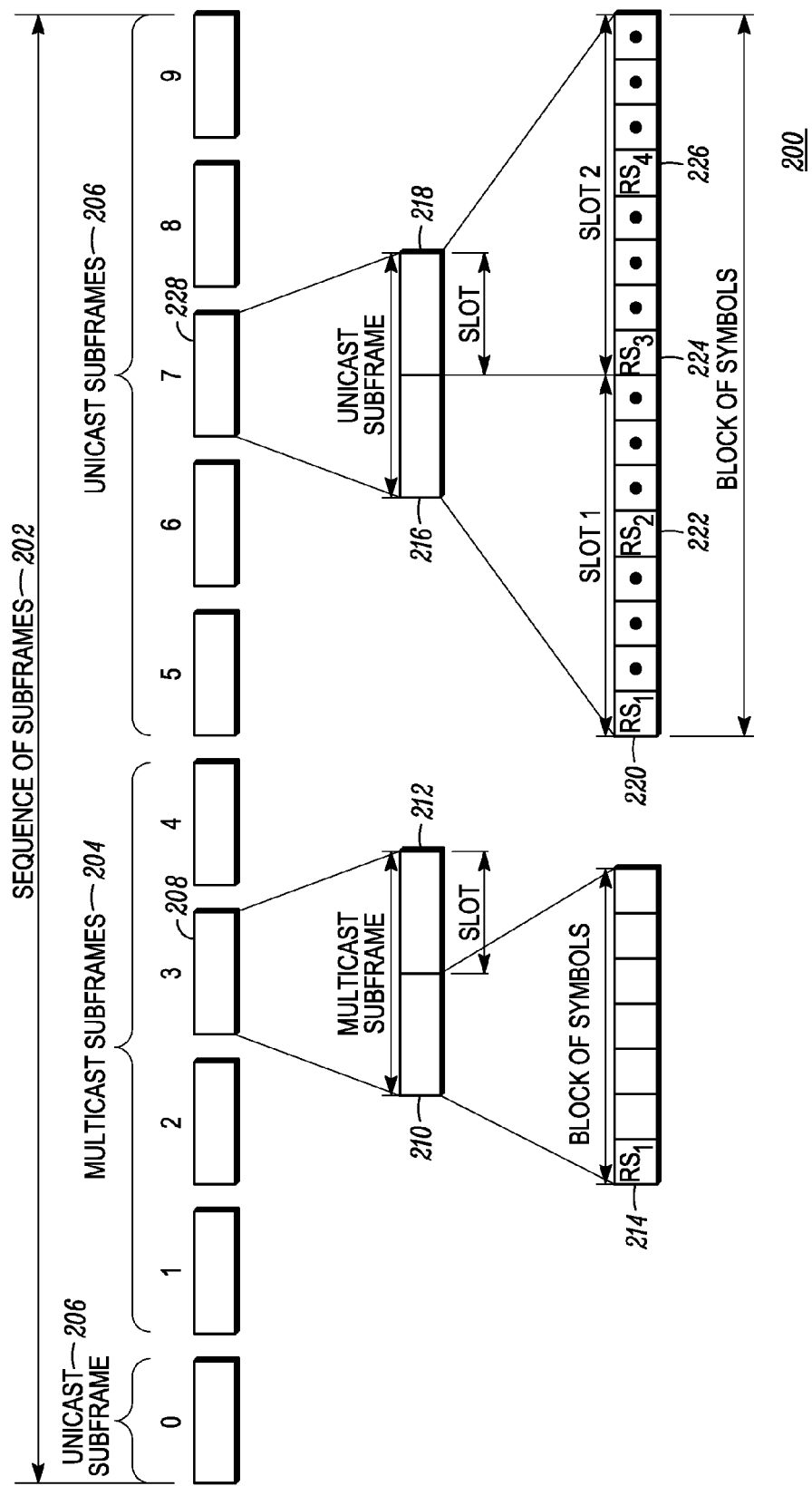
FIG. 2 is a block diagram of a multi-level framing structure in accordance with some embodiments.

FIG. 2 is a multi-level framing structure 200 in accordance with some embodiments. In this example, the multi-level framing structure 200 comprises a sequence of subframes 202. The sequence of subframes 202 is a combination of a subsequence of multicast subframes 204 and a subsequence of unicast subframes 206. For example, in FIG. 2, the sequence of subframes comprises 1 unicast subframe, followed by a subsequence of 4 multicast subframes, followed by a subsequence of 5 unicast subframes. In another embodiment, the sequence of subframes may have a complete sequence of unicast subframes or a mixed sequence of unicast and multicast subframes. In one possible implementation of this multi-level framing structure 200 in a 3GPP LTE communication network, each subframe comprises 2 slots, and each slot comprises a block of 6 or 7 orthogonal frequency division multiplexing (OFDM) symbols. The number of OFDM symbols per slot is determined in combination with the cyclic prefix (CP) length of each OFDM symbol and where the number of OFDM symbols per slot for unicast and multicast subframes need not be identical. In one example, multicast subframes comprise 6 OFDM symbols per subframe and unicast subframes comprise 7 OFDM symbols per subframe, although other combinations are possible. Each multicast subframe may comprise a time-division multiplexed (TDM) subset of OFDM symbols which are unicast by each node, and a subset which are multicast by a multicast group of nodes.

In one embodiment, the multicast subframe 208 comprises only 1 unicast RS-bearing OFDM symbol from which the power level or RSRP or RS-SNR or RS-SINR in the neighboring cell node is measured. The RS-bearing OFDM symbol is located in the first slot of the multicast subframe 208. Similarly, the unicast subframe 228 comprises two slots 216, 218 and each slot comprises at least 2 RS-bearing OFDM symbols. The first RS-bearing OFDM symbol (RS1) is located in the first OFDM symbol position of each of the slots 216, 218 and the second RS-bearing OFDM symbol (RS2) is located in the fifth OFDM symbol position of each of the slots 216, 218 of the unicast subframe 228. The RS-bearing OFDM symbols are generally used for decoding the received subframes at the mobile device, e.g., by assisting in executing channel estimation etc. However, during mobility of the mobile device 108, the RS-bearing OFDM symbols are used for performing mobility measurements such as power, RSRP or RS-SINR measurements in the neighboring cell from which the subframe is received. The process of measuring power from the RS symbols in the received subframe is known as reference symbol received power (RSRP) measurement. Thus, the unicast subframe comprises 2 RS-bearing OFDM symbols in each slot and has a total of 4 RS-bearing OFDM symbols.

In one embodiment, the sequence of subframes 202 is of 10 milliseconds (ms) in length and may be divided into 10 subframes each of which are 1 ms in time duration. Each of the 10 subframes may be further sub-divided into 2 slots each of which are 0.5 ms in time duration.

In another embodiment, each slot in a subframe comprises 6 or 7 OFDM symbols known as block of OFDM symbols. In the case of a 7 OFDM symbols block, the first OFDM symbol and the fifth OFDM symbol comprise RS-bearing OFDM symbols from which the mobility measurements such as power level in the subframe is measured. Thus, a frame of 1 ms time duration comprises 10 subframes of each 1 ms time duration and 20 slots of each 0.5 ms time duration.

In some embodiments, the neighboring cell node 112 transmits a subframe sequence pattern to the serving cell node 102. The subframe sequence pattern indicates a sequence pattern of subframes, shown in FIG. 2, transmitted by the neighboring cell node 112. The subframe sequence pattern provides information such as type of subframes transmitted by the neighboring cell node and the position of such subframes in the sequence. For example, the subframe sequence pattern "US-MS-MS-MS MS US US US US US" indicates that the first subframe in the sequence is a unicast subframe, next 4 subframes in the sequence are multicast subframes, and the last 5 subframes are unicast subframes. The subframe sequence pattern is not limited to the one shown in the above example.

In one embodiment, the serving cell node 102 may forward the received subframe sequence pattern to the mobile device 108 that resides at the edge of the serving cell 110. In another embodiment, the mobile device 108 may receive the subframe sequence pattern directly from the neighboring cell node 104. At the other end, the mobile device 108 utilizes the subframe sequence pattern to determine the type of subframe from a sequence of subframes received from the neighboring cell node 104 and accordingly measures the power level in the received subframe. For example, if the received subframe is a multicast subframe then the power level is measured from only 1 RS-bearing OFDM symbol in the subframe. On the other hand, if the received subframe is a unicast subframe then the power level is measured from up to 4 RS-bearing OFDM symbols in the subframe.

In another embodiment, the serving cell node 102 may receive from each neighboring cell, subframe sequence pattern information corresponding to each carrier frequency supported by each neighboring cell. The serving cell node 102 then transmits carrier frequency specific subframe sequence pattern information to the mobile device 108, which is later used for performing inter-frequency mobility measurements.

In one embodiment, the serving cell node 102 may determine, upon receiving subframe sequence pattern information from each of the neighboring cells 112, 114, that none of the neighboring cells 112, 114 is transmitting multicast subframes or at least one neighboring cell 112 is transmitting multicast frames. In such an embodiment, the transmission of cell-specific subframe sequence patterns to the mobile device 108 may be reduced to transmit a single bit signal or a single binary indicator directing the mobile device 108 to consider either a) all subframes are unicast, in which case all RS-bearing OFDM symbols in all subframes are available for measurement, or b) at least one subframe is multicast, in which case the mobile device 108 may restrict its measurements to only 1 RS-bearing OFDM symbol in all subframes. Note that the serving cell node 102 may transmit such a single bit signal or a single binary indicator to the mobile device 108 over each carrier frequency supported by the communication network 100, or may transmit a single such binary indicator applicable in common to all carrier frequencies in the communication network 100.

In another embodiment, the serving cell node 102 receives subframe sequence pattern from each of the neighboring cell nodes 104, 106. Upon receiving such subframe sequence pattern, the serving cell node 102 determines that all the neighboring cell nodes 104, 106 are transmitting the same subframe sequence pattern as that of the serving cell node 102. The serving cell node 102 then modifies the single bit signal or the single binary indicator, and transmits the modified single bit signal or single binary indicator to the mobile device 108. The modified single bit signal or single binary indicator indicates to the mobile device that a) the neighboring cell nodes 104, 106 have same subframe sequence pattern as that of the serving cell node 102, or b) at least one neighbor cell node 104 has a different subframe sequence pattern. In the second case (b), the mobile device 108 may restrict its measurements to only 1 RS-bearing OFDM symbol in all subframes received from the neighboring cell nodes 104, 106. Note that the serving cell node 102 may transmit such a modified single bit signal or single binary indicator for each carrier frequency supported by the network 100, or may transmit a single bit signal or single binary indicator applicable in common to all carrier frequencies in the network 100. In another embodiment, the single bit signal or single binary indicator is transmitted over a control channel such a broadcast control channel (BCH) or a multicast control channel (MCCH).

Figure 3:
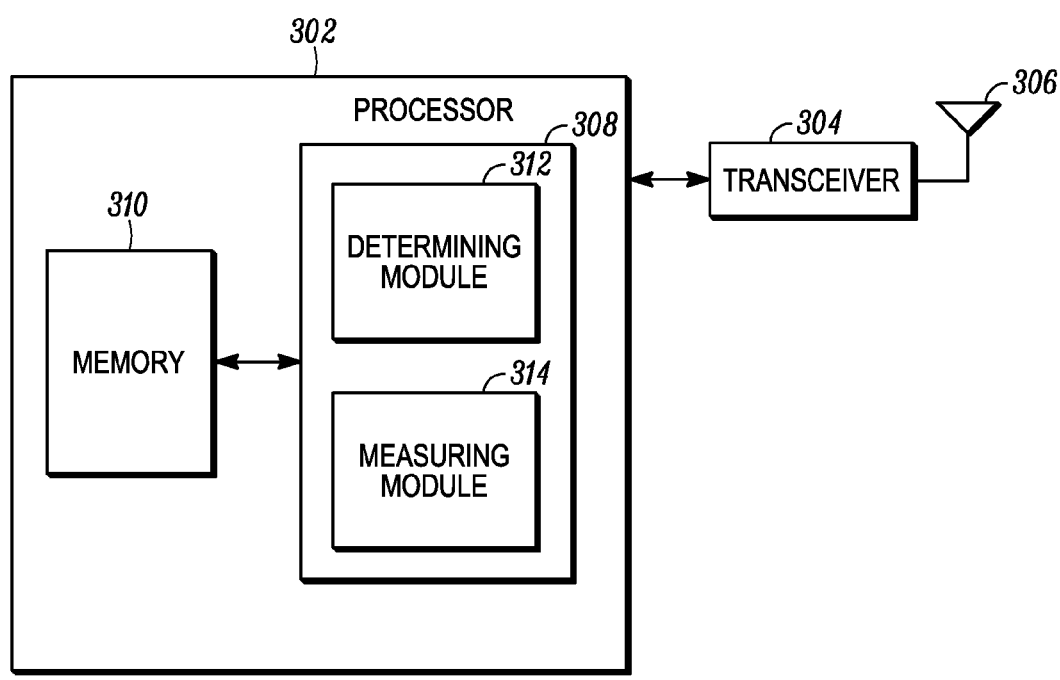
FIG. 3 is a block diagram of a mobile device in accordance with some embodiments.

FIG. 3 is a block diagram of a mobile device in accordance with some embodiments of the invention. The mobile device 300 comprises a processor 308, a memory 310, a transceiver 304, and an antenna 306 for performing mobility measurement in the communication network 100.

The memory 310 is a common storage unit that is coupled to the processor 308 for storing the subframe sequence pattern received from each node in the neighboring cells 112, 114. The subframe sequence pattern indicates the types of subframes being transmitted by the neighboring cell nodes 104, 106. In one embodiment, the subframe sequence may be a sequence of only unicast subframes or a combination of unicast and multicast subframes. In one embodiment, the memory 310 may be embedded within a processor 308 or may be placed external to the processor 308. The memory 310 maintains a database in which a link is created between the received subframe sequence pattern and an identification associated with the corresponding neighboring cell node.

The processor 308 coupled between the memory 310 and the transceiver 304 operates to perform cell-specific reference symbol power measurement from the received subframe. The processor 308, initially, stores the subframe sequence pattern in the memory 310 coupled therewith, and utilizes such sequence pattern to determine the type of subframe received from the corresponding neighboring cell node 104. In one embodiment, the subframe may be a part of the sequence of subframes transmitted by the neighboring cell node 104.

In one embodiment, the processor 308 is configured with two modules, a determining module 312 and a measuring module 314. The determining module 312 is configured to determine the type of subframe received from the neighboring cell node 104. The determining module 312 determines the type by extracting a sequence number of the received subframe and comparing the sequence number with the corresponding subframe sequence pattern. For example, the extracted sequence number may be 2 and is compared with the subframe sequence pattern "US-MS-MS-MS US US US US US." The subframe type at the position associated with the number '2' in the subframe sequence pattern is the multicast subframe and thus, the type of subframe received is considered as the multicast subframe.

The measuring module 314 is configured for performing cell-specific reference symbol measurements such as power measurement or other mobility measurements based on the type of the subframe determined by the determining module 312. For example, if the subframe determined is as a multicast subframe then a single cell-specific reference symbol power measurement is performed on RS1 (See FIG. 2, 214.) Similarly, if the subframe determined is a unicast subframe then up to four cell-specific reference symbol power measurements are performed and then combined, such as by linear averaging. The measuring module 314 performs such power measurement by measuring power in each reference symbol in the subframe, and computing a linear average of all the measured power in the subframe, or other combining means. Thus, accuracy in measuring power in a unicast subframe is generally higher than measuring power in a multicast subframe.

In another embodiment, to achieve specific measurement accuracy, the mobile device 300 may elect to adjust the number of performed reference symbol measurements to meet the required accuracy. For example, the mobile device 300 may use its knowledge that specific subframes are used for unicast transmission to exploit the larger number of RS-bearing OFDM symbol observations available in such subframes. Accordingly, in order to generate the same total number of RS-bearing OFDM symbol observations, the mobile device 300 may advantageously schedule measurements to coincide with known unicast subframes, and so reduce the total number of measured subframes of any type. By so reducing the total number of measured subframes, the mobile device 300 may reduce the total activity time of its radio subsystem and other processing elements and so reduce total power consumption or current drain. Alternatively, the mobile device 300 may use its knowledge of the occurrence of unicast subframes to reduce the total number of subframe observations required to meet the measurement accuracy for a specific neighboring cell and so measure more neighboring cells per unit time while maintaining the same level of accuracy.

In one embodiment, the mobile device 300 is configured with a transceiver 304, which is coupled to the processor 308. The transceiver 304 is known and can vary with the communication technology. The transceiver 304 operates as a receiver and a transmitter for receiving and transmitting subframes via the antenna 306 from or to the network. In an embodiment, the transceiver 304 operates for receiving and transmitting subframes from different mobile devices and infrastructure components (not shown) of the network. In an embodiment, the transceiver 304 may receive the subframe sequence pattern over a control channel and sends it to the processor 308. In another embodiment, the transceiver 304 may receive the single bit signal or single binary indictor from the serving cell. The transceiver 304 may be a separate transmitter and a receiver operating independently for transmitting and receiving signals in the communication network, e.g. network 100.

Operationally, the transceiver 304 receives a subframe sequence pattern from each node in the neighboring cells 112, 114. In one embodiment, the subframe sequence pattern of the neighboring cell nodes 112, 114 may be received from the serving cell node 102 in the serving cell 110. For example, the transceiver 304 receives the subframe sequence pattern of the neighboring cell node 104 via the serving cell node 102. In another embodiment, the subframe sequence pattern may be received directly from the neighboring cell nodes 104, 106 in the neighboring cells 112, 114 respectively. The subframe sequence pattern is received over a common control channel such as a BCH, or a MCCH or via a dedicated transmission, such as a physical downlink shared channel (PDSCH). The transceiver 304 sends the received subframe sequence pattern to the processor 308 that is couple therewith.

The processor 308 stores the received subframe sequence pattern in the memory 310. The procedure is repeated for each subframe sequence pattern received by the transceiver 304 of the mobile device 300.

The processor 308 then receives a subframe from a sequence of subframes transmitted by the neighboring cell node 104. The processor 308 extracts a sequence number from the received subframe and identifies the type of subframe present in the subframe sequence pattern at a position associated with the sequence number. The processor 308 then determines the type of the subframe received based on the identified type in the subframe sequence pattern. The processor 308 further measures the power level in the received subframe by measuring power from only first cell-specific RS-bearing OFDM symbol if the received subframe is a multicast subframe, and measuring power from 4 cell-specific RS-bearing OFDM symbols if the received subframe is a unicast subframe.

In one embodiment, the above described procedure is repeated for the sequence of subframes received from each neighboring cell node. The mobile device 300 then determines the neighboring cell that has a maximum power level, reports such data along with other ancillary measurement data to the network, and finally may be directed by the network to move to that particular neighboring cell.

Figure 4:
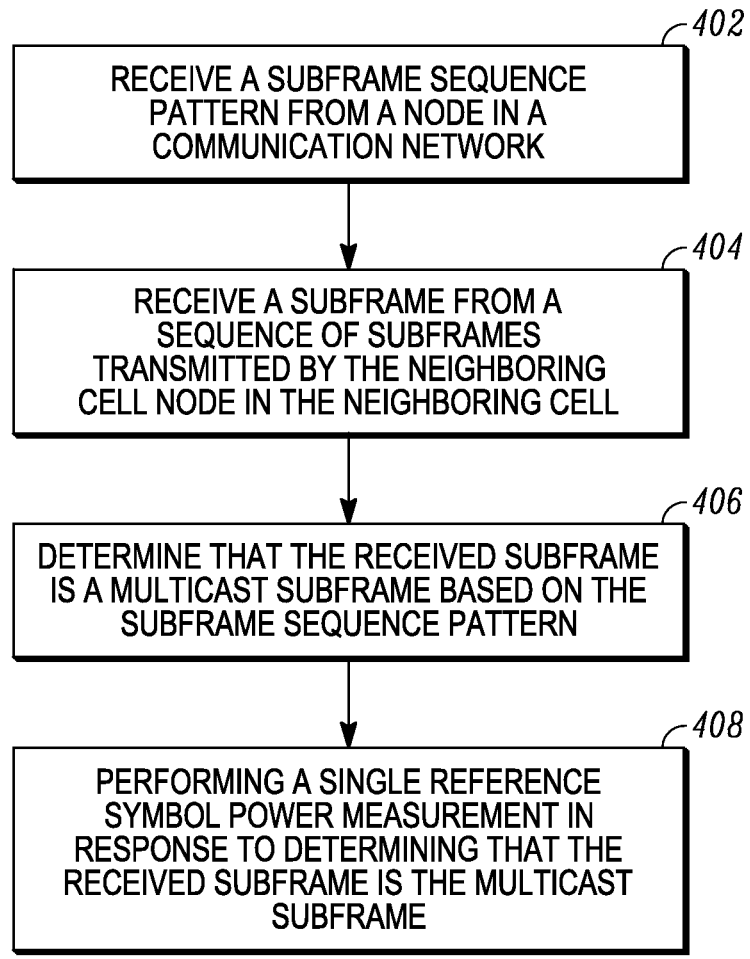
FIG. 4 is flowchart of a method for performing mobility measurements in a communication network based on a subframe sequence pattern in accordance with some embodiments.

FIG. 4 is a flowchart of a method 400 for performing mobility measurements based on a subframe sequence pattern in accordance with some embodiments of the invention is shown. In an embodiment, the method 400 is described from the perspective of a mobile device, e.g. mobile device 108 of FIG. 1. The method 400 starts with receiving 402 a subframe sequence pattern from a node in the communication network 100. The node may be a serving cell node 102 in the serving cell 110 or a neighboring cell node 104 in a neighboring cell 112. The subframe sequence pattern indicates different types of subframes being transmitted by the neighboring cell node 104 in the neighboring cell 112. For example, the subframe sequence pattern indicates whether a received subframe is a unicast subframe or a multicast subframe. The mobile device 108 stores the received subframe sequence pattern and utilizes such stored subframe sequence pattern to identify the type of subframe received from the corresponding neighboring cell node 104. The received subframe sequence pattern is independent of a subframe sequence pattern of the serving cell node 102 in the serving cell 110. For example, the neighboring cell node 104 in the neighboring cell 112 may not have the same subframe sequence pattern of the serving cell node 102 in the serving cell 110 or of any other neighboring cells.

The method 400 continues with a step of receiving 404 a subframe from a sequence of subframes transmitted by the neighboring cell node 104 in the neighboring cell 112. The sequence of subframe may be a sub-sequence of unicast subframes and a sub-sequence of multicast subframes. The method 400 then continues with a step of determining 406 that the received subframe is a multicast subframe based on the corresponding subframe sequence pattern. A sequence number of the subframe is compared with the subframe sequence pattern and the type of subframe, in the subframe sequence pattern, at a position associated with the sequence number is determined The method then continues with a step of performing 408 a single cell-specific reference symbol measurement in response to determining that the received subframe is the multicast subframe. The single cell-specific symbol measurement includes measuring power of a cell-specific reference symbol in the received subframe, or measuring signal-to-noise ratio of a cell-specific reference symbol in the received subframe.

Figure 5:
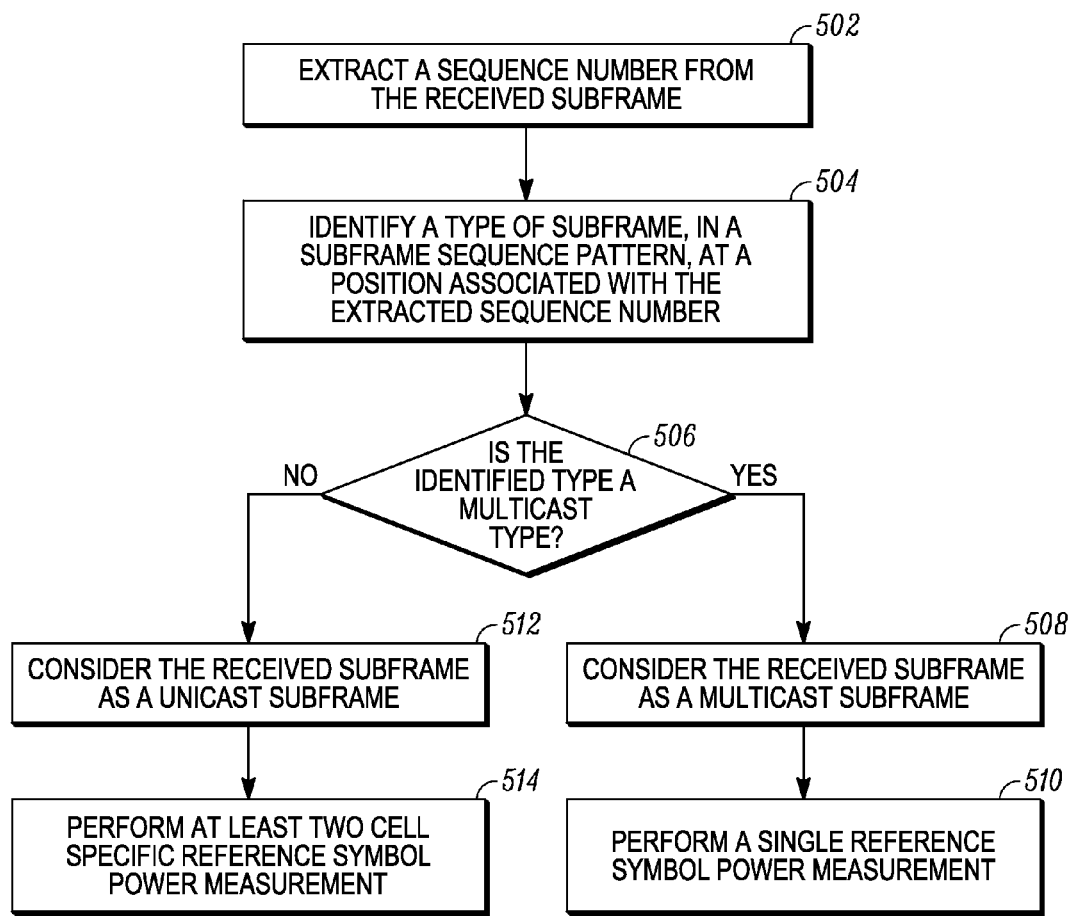
FIG. 5 is a flow chart of a method for determining a type of subframe received based on the subframe sequence pattern in accordance with some embodiments.

FIG. 5 is a flow chart of a method for determining a type of subframe based on the subframe sequence pattern in accordance with some embodiments. The method 500 is described with reference to FIG. 1. The method 500 described from the perspective of a mobile device, e.g. mobile device 108 of FIG. 1.

The method 500 describes the steps 406 and 408 of FIG. 4 in accordance with some embodiments. The method 500 begins with the step of extracting 502 a sequence number from the received subframe. The extracted sequence number indicates a position in the sequence of subframes transmitted by the neighboring cell node 104. The method 500 continues with a step of identifying 504 a type of subframe present, in the subframe sequence pattern, at a position associated with the extracted sequence number. The extracted sequence number of the subframe is compared with the subframe sequence pattern. The type of subframe present at a position associated with the extracted sequence number, in the subframe sequence pattern, is identified.

The method 500 continues with a step of determining 506 whether the identified type is a multicast type. If the identified type is a multicast type then the method continues with a step of considering 508 the received subframe as a multicast subframe. The method 500 then continues with a step of performing 510 a single cell-specific reference symbol measurement in response to determining that the received subframe is the multicast subframe.

On the other hand, if the identified type is a unicast type then the method 500 continues with a step of considering 512 the received subframe as a unicast subframe. The method then continues with a step of performing 514 at least two cell-specific reference symbols measurement. The unicast subframe has 4 RS symbols and thus, measuring power using 4 RS symbols may improve the accuracy of power measurement in the neighboring cell. Thus, power measurement is varied according to the type of subframe received from the neighboring cell node 104.

Figure 6:
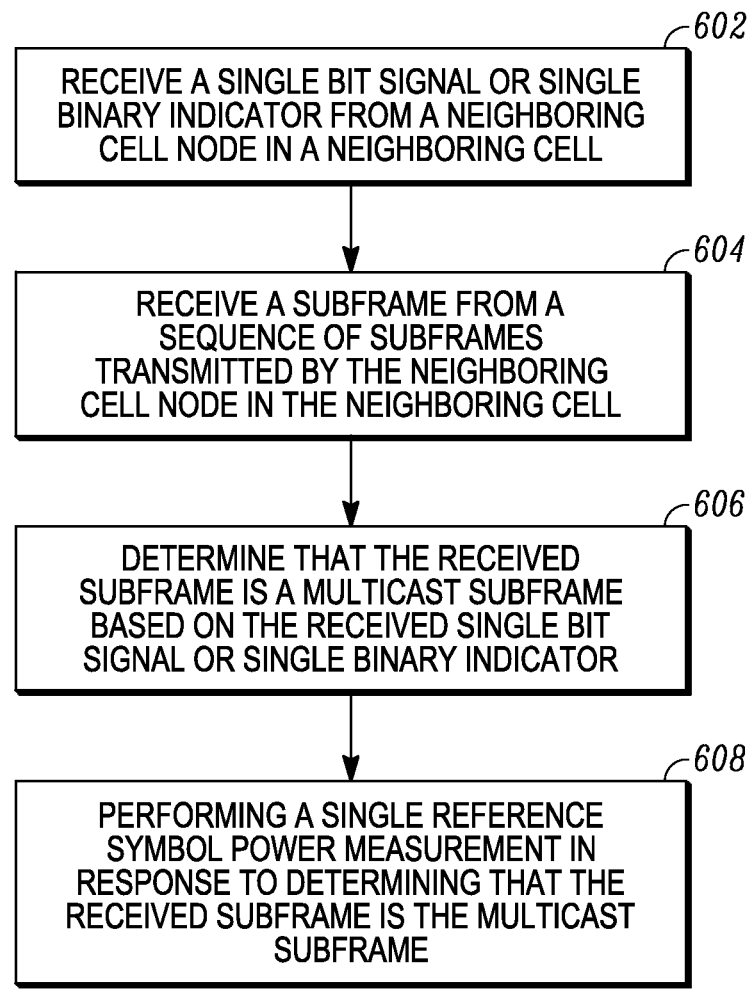
FIG. 6 is a flowchart of a method for performing mobility measurements in a communication network based on a single bit signal or single binary indicator in accordance with some embodiments.

FIG. 6 is a flowchart of a method for performing mobility measurements in a communication network based on a single bit signal or single binary indicator in accordance with some embodiments is shown. In an embodiment, the method 600 is described from the perspective of a mobile device, e.g. mobile device 108 of FIG. 1. The method 600 starts with receiving 602 a single bit signal or single binary indicator from a serving cell node 102. The single bit signal indicates a type of subframes being transmitted by the neighboring cell node 104 in the neighboring cell 112. The single bit signal or single binary indicator may be transmitted over common control channels such as BCH, or MCCH or even using a dedicated control channel, or may be included in a handover control message.

The method continues with a step of receiving 604 a subframe from a sequence of subframes transmitted by the neighboring cell node 104 in the neighboring cell 112. The subframe received may be a unicast subframe or a multicast subframe. The unicast subframe has 4 OFDM symbol bearing RS symbols and the multicast subframe has 1 OFDM symbol bearing RS symbols. The OFDM symbol bearing RS symbols may be used for performing different mobility measurements such as a power, RSRP or RS-SINR measurements for the received subframe.

The method then continues with a step of determining 606 that the received subframe is a multicast subframe based on the single bit signal or single binary indicator received from the serving cell node 102. The single bit signal or single binary indicator indicates that (a) at least one neighboring cell node 104 transmits at least one multicast subframe, or (b) no neighboring cell node transmits at least one multicast subframe. In the first case (a), the mobile device 108 ascertains all the received subframes as the multicast subframes and performs mobility measurement using only single cell-specific reference symbol. In the second case (b), the mobile device 108 ascertains all the received subframes as the unicast subframes and performs mobility measurement using at least two cell-specific reference symbols.

Further, upon determining 606 that the received subframe is a multicast subframe, the method 600 continues with a step of performing 608 a single cell-specific reference symbol measurement. The cell-specific reference symbol measurement may be any kind of mobility measurement such as a power, RSRP or RS-SINR measurements.

Figure 7:
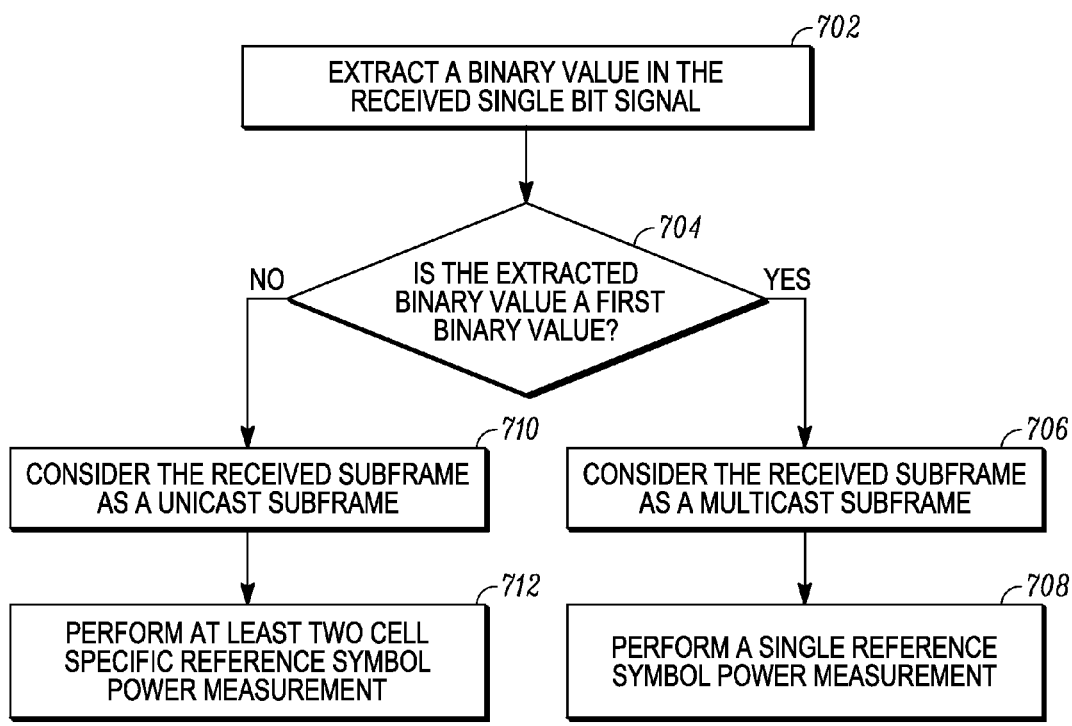
FIG. 7 is a flow chart of a method for determining a type of subframe received based on the single bit signal or single binary indicator in accordance with some embodiments.

FIG. 7 is a flow chart of a method for determining a type of subframe based on the single bit signal in accordance with some embodiments is shown. The method 700 is described with reference to FIG. 1. The method 700 described from the perspective of a mobile device, e.g. mobile device 108 of FIG. 1. The method 700 describes a step 606 of FIG. 6 in accordance with some embodiments. The method 700 begins with a step of extracting 702 a binary value from the received single bit signal. The binary value indicates the type of subframes transmitted by the neighboring cell nodes 104, 106.

The method 700 then continues with a step of determining 704 whether the extracted binary value is a first binary value. If the extracted binary value is a first binary value, e.g., '1', then the method continues with a step of considering 706 at least one neighboring cell node 104 transmits at least one multicast subframe. The first binary value indicates to the mobile device that the neighboring cell nodes may transmit multicast subframes and accordingly informs the mobile device to perform mobility measurement by using only single cell-specific reference symbol for all the subframes received from the neighboring cell nodes 104, 106.

The method 700 then continues with a step of ascertaining 708 that the received subframe is the multicast subframe in response to considering at least one neighboring cell node transmits at least one multicast subframe.

On the other hand, at step 704, if the binary value is not a first binary value or the binary value is a second binary value then the method 700 continues with a step of considering 710 no neighboring cell node transmits at least one multicast subframe. The second binary value, e.g., '0', indicates to the mobile device that no multicast subframes are transmitted by the neighboring cell nodes 104, 106 and accordingly informs the mobile device to perform mobility measurement using at least two cell-specific reference symbols for all the subframes received from the neighboring cell nodes 104, 106. Thus, the type of subframes received from the neighboring cell nodes 104, 106 is determined based on the binary value present in the single bit signal received by the mobile device 108.

In an alternate embodiment, the serving cell node 102 may receive subframe sequence pattern from each of the neighboring cell nodes 104, 106. If the received subframe sequence pattern is same as a subframe sequence pattern of the serving cell node 102, the serving cell node 102 modifies the binary value in the single bit signal. Further, the modified single bit signal is transmitted to the mobile device to indicate that the subframe sequence pattern is same for all the cell nodes 104, 106 in the communication network 100. The mobile device then performs mobility measurements by considering a common subframe sequence pattern for all the subframes received from the neighboring cell nodes 104, 106 in the communication network 100. In one embodiment, the transmitted single bit signal is associated with each of at least two carrier frequencies in the communication network 100.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method in a mobile device for mobility measurements in a communication network, the method comprising:
    receiving a subframe sequence pattern from a node in the communication network, the subframe sequence pattern indicates a type of subframe being transmitted by a neighboring cell node, wherein the type of subframe includes a unicast subframe comprising at least two orthogonal frequency division multiplexing (OFDM) symbol bearing cell-specific reference symbols, and a multicast subframe comprising at least one OFDM symbol bearing reference symbols;
    receiving a subframe from a sequence of subframes transmitted by the neighboring cell node; and
    measuring power or signal-to-noise ratio of a reference symbol in the received subframe.

2. The method of claim 1 further comprising:
    determining that the received subframe is the unicast subframe based on the subframe sequence pattern; and
    performing at least one measurement based on at least two OFDM symbol bearing cell-specific reference symbols in response to determining that the received subframe is the unicast subframe.

3. The method of claim 1, wherein receiving the subframe sequence pattern comprises receiving the subframe sequence pattern from a serving cell node in a serving cell, wherein the serving cell is a cell in which the mobile device is currently located.

4. The method of claim 1, wherein receiving the subframe sequence pattern comprises receiving the subframe sequence pattern from the neighboring cell node.

5. The method of claim 1, wherein the subframe sequence pattern is received over a broadcast control channel (BCH) or a multicast control channel (MCCH).

6. The method of claim 1, wherein the subframe sequence pattern indicates a sequence pattern of unicast and multicast subframes transmitted by the neighboring cell node.

7. A method in a mobile device for mobility measurements in a communication network, the method comprising:
    receiving a subframe sequence pattern from a node in the communication network, the subframe sequence pattern indicates a type of subframe being transmitted by a neighboring cell node, wherein the type of subframe includes a unicast subframe comprising at least two orthogonal frequency division multiplexing (OFDM) symbol bearing cell-specific reference symbols, and a multicast subframe comprising at least one OFDM symbol bearing reference symbols;
    receiving a subframe from a sequence of subframes transmitted by the neighboring cell node;

extracting a sequence number from the received subframe, wherein the sequence number indicates a position in the sequence of subframes transmitted by the neighboring cell node;
identifying a type of subframe present, in the subframe sequence pattern, at a position associated with the extracted sequence number;
considering the received subframe as the multicast subframe when the identified type is a multicast type; and
considering the received subframe as the unicast subframe when the identified type is a unicast type.

8. A method in a mobile device for mobility measurements in a communication network, the method comprising:
receiving a subframe sequence pattern from a node in the communication network, the subframe sequence pattern indicates a type of subframe being transmitted by a neighboring cell node, wherein the type of subframe includes a unicast subframe comprising at least two orthogonal frequency division multiplexing (OFDM) symbol bearing cell-specific reference symbols, and a multicast subframe comprising at least one OFDM symbol bearing reference symbols; and
receiving a subframe from a sequence of subframes transmitted by the neighboring cell node,
wherein the received subframe sequence pattern is independent of a subframe sequence pattern of the serving cell node.

9. A method in a mobile device for mobility measurements in a communication network, the method comprising:
receiving an indicator from a serving cell node, wherein the indicator indicates a type of subframe being transmitted by at least one neighboring cell node, wherein the type of subframe includes a unicast subframe comprising at least two orthogonal frequency division multiplexing (OFDM) symbol bearing cell-specific reference symbols, and a multicast subframe comprising at least one OFDM symbol bearing reference symbols; and
receiving a subframe from a sequence of subframes transmitted by the neighboring cell node,
wherein the indicator indicates that a subframe sequence pattern of each neighboring cell node is same as a subframe sequence pattern.

10. The method of claim 9, wherein the indicator is received over a control channel.

11. A method in a mobile device for mobility measurements in a communication network, the method comprising:
receiving an indicator from a serving cell node, wherein the indicator indicates a type of subframe being transmitted by at least one neighboring cell node, wherein the type of subframe includes a unicast subframe comprising at least two orthogonal frequency division multiplexing (OFDM) symbol bearing cell-specific reference symbols, and a multicast subframe comprising at least one OFDM symbol bearing reference symbols;
receiving a subframe from a sequence of subframes transmitted by the neighboring cell node;
determining that the received subframe is the unicast subframe based on the received indicator, wherein determining that the received subframe is the unicast subframe comprises:
extracting a binary value from the received indicator;
considering no neighboring cell node transmits at least one multicast subframe when the extracted binary value is a second binary value; and
ascertaining that the received subframe is the unicast subframe in response to considering no neighboring cell transmits at least one multicast subframe; and
performing at least one measurement based on at least two symbol bearing cell-specific reference symbols in response to determining that the received subframe is the unicast subframe.

12. A method in a mobile device for mobility measurements in a communication network, the method comprising:
receiving an indicator from a serving cell node, wherein the indicator indicates a type of subframe being transmitted by at least one neighboring cell node, wherein the type of subframe includes a unicast subframe comprising at least two orthogonal frequency division multiplexing (OFDM) symbol bearing cell-specific reference symbols, and a multicast subframe comprising at least one OFDM symbol bearing reference symbols;
receiving a subframe from a sequence of subframes transmitted by the neighboring cell node,
wherein the received indicator is associated with each of at least two carrier frequencies in the communication network.

13. A method in a mobile device for mobility measurements in a communication network, the method comprising:
receiving an indicator from a serving cell node, wherein the indicator indicates a type of subframe being transmitted by at least one neighboring cell node, wherein the type of subframe includes a unicast subframe comprising at least two orthogonal frequency division multiplexing (OFDM) symbol bearing cell-specific reference symbols, and a multicast subframe comprising at least one OFDM symbol bearing reference symbols;
receiving a subframe from a sequence of subframes transmitted by the neighboring cell node,
wherein performing the single reference symbol measurement comprises measuring power of a first reference symbol in the received subframe when the received subframe is the multicast subframe, the measured power indicating a power level in the neighboring cell.

14. An apparatus in a mobile device for mobility measurements in a communication network, the apparatus comprising:
a transceiver configured to receive a subframe sequence pattern from a node in the communication network, wherein the subframe sequence pattern indicates a type of subframe being transmitted by a neighboring cell node, wherein the type of subframe includes a unicast subframe comprising at least two orthogonal frequency division multiplexing (OFDM) symbol bearing reference symbols, and a multicast subframe comprising at least one OFDM symbol bearing reference symbols; and to receive a subframe from a sequence of subframes transmitted by the neighboring cell node; and
a processor, coupled to the transceiver, configured to determine that the received subframe is the multicast subframe based on the subframe sequence pattern; and to perform a single reference symbol measurement in response to determining that the received subframe is the multicast subframe.

15. The apparatus of claim 14 further comprising a processor, coupled to the transceiver, configured to determine that the received subframe is the unicast subframe based on the subframe sequence pattern; and to perform at least one measurement based on at least two symbol bearing cell-specific reference symbols in response to determining that the received subframe is the unicast subframe.

16. A method in a mobile device for mobility measurements in a communication network, the method comprising:
receiving a subframe sequence pattern from a node in the communication network, the subframe sequence pattern indicates a type of subframe being transmitted by a neighboring cell node, wherein the type of subframe includes a unicast subframe comprising at least two orthogonal frequency division multiplexing (OFDM) symbol bearing cell-specific reference symbols, and a multicast subframe comprising at least one OFDM symbol bearing reference symbols;

receiving a subframe from a sequence of subframes transmitted by the neighboring cell node;

determining that the received subframe is the multicast subframe based on the subframe sequence pattern; and performing a single reference symbol measurement in response to determining that the received subframe is the multicast subframe.

17. A method in a mobile device for mobility measurements in a communication network, the method comprising:

receiving an indicator from a serving cell node, wherein the indicator indicates a type of subframe being transmitted by at least one neighboring cell node, wherein the type of subframe includes a unicast subframe comprising at least two orthogonal frequency division multiplexing (OFDM) symbol bearing cell-specific reference symbols, and a multicast subframe comprising at least one OFDM symbol bearing reference symbols;

receiving a subframe from a sequence of subframes transmitted by the neighboring cell node;

determining that the received subframe is the multicast subframe based on the received indicator; and performing a single reference symbol measurement in response to determining that the received subframe is the multicast subframe.

18. The method of claim 17, wherein determining that the received subframe is the multicast subframe comprises:

extracting a binary value from the received indicator;

considering at least one neighboring cell node transmits at least one multicast subframe when the extracted binary value is a first binary value;

ascertaining that the received subframe is the multicast subframe in response to considering at least one neighboring cell node transmits at least one multicast subframe.

* * * * *